United States Patent
Miyazawa et al.

[11] Patent Number: 5,983,186
[45] Date of Patent: *Nov. 9, 1999

[54] VOICE-ACTIVATED INTERACTIVE SPEECH RECOGNITION DEVICE AND METHOD

[75] Inventors: Yasunaga Miyazawa; Mitsuhiro Inazumi; Hiroshi Hasegawa; Isao Edatsune; Osamu Urano, all of Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/700,181

[22] Filed: Aug. 20, 1996

[30] Foreign Application Priority Data

Aug. 21, 1995 [JP] Japan ................................ 7-212248

[51] Int. Cl.[6] .......................................................... G10L 5/00
[52] U.S. Cl. ........................... 704/275; 704/251; 704/233
[58] Field of Search ..................... 179/15, 251; 704/212, 704/275, 246, 233, 255; 381/57

[56] References Cited

U.S. PATENT DOCUMENTS

| | | | |
|---|---|---|---|
| 2,338,551 | 1/1944 | Stanko | 381/57 |
| 4,052,568 | 10/1977 | Jankowski | 179/15 |
| 5,218,668 | 6/1993 | Higgins et al. | 704/251 |
| 5,278,944 | 1/1994 | Saski | 704/212 |
| 5,562,453 | 10/1996 | Wen | 704/275 |
| 5,577,164 | 11/1996 | Kaneko | 704/275 |
| 5,668,929 | 9/1997 | Foster | 704/246 |
| 5,704,009 | 12/1997 | Cline | 704/246 |
| 5,794,198 | 8/1998 | Yegnanarayanan et al. | 704/255 |
| 5,799,279 | 8/1998 | Gould et al. | 704/275 |

FOREIGN PATENT DOCUMENTS

| | | |
|---|---|---|
| 62-253093 | 11/1987 | Japan . |
| 6-4097 | 1/1994 | Japan . |
| 6-119476 | 4/1994 | Japan . |

*Primary Examiner*—David R. Hudspeth
*Assistant Examiner*—Daniel Abebe
*Attorney, Agent, or Firm*—Michael T. Gabrik

[57] ABSTRACT

Techniques for implementing adaptable voice activation operations for interactive speech recognition devices and instruments. Specifically, such speech recognition devices and instruments include an input sound signal power or volume detector in communication with a central CPU for bringing the CPU out of an initial sleep state upon detection of perceived voice exceeding a predetermined threshold volume level and is continuously perceived for at least a certain period of time. If both these conditions are satisfied, the CPU is transitioned into an active mode so that the perceived voice can be analyzed against a set of registered key words to determine if a "power on" command or similar instruction has been received. If so, the CPU maintains an active state in normal speech recognition processing ensues until a "power off" command is received. However, if the perceived and analyzed voice can not be recognized, it is deemed to be background noise and the minimum threshold is selectively updated to accommodate the volume level of the perceived but unrecognized voice. Other aspects include tailoring the volume level of the synthesized voice response according to the perceived volume level as detected by the input sound signal power detector, as well as modifying audible response volume in accordance with updated volume threshold levels.

9 Claims, 4 Drawing Sheets

VOICE-ACTIVATED INTERACTIVE SPEECH RECOGNITION DEVICE AND METHOD

CROSS REFERENCE TO RELATED APPLICATIONS

This Application is related to copending application Ser. No. 08/700,175 filed on the same date of the present application, Attorney's Docket number P2504a, entitled "A Cartridge Based Interactive Voice Recognition Method and Apparatus", copending application Ser. No. 08/669,874, filed on the same date of the present application, Attorney's Docket number P2505a, entitled "A Speech Recognition Device and Processing Method", all commonly assigned with the present invention to the Seiko Epson Corporation of Tokyo, Japan. This application is also related to the following copending applications: application Ser. No. 08/078,027, filed Jun. 18, 1993, entitled "Speech Recognition System"; application Ser. No. 08/102,859, filed Aug. 6, 1993, entitled "Speech Recognition Apparatus"; application Ser. No. 08/485,134, filed Jun. 7, 1995, entitled "Speech Recognition Apparatus Using Neural Network and Learning Method Therefore"; and application Ser. No. 08/536,550, filed Sep. 29, 1996, entitled "Interactive Voice Recognition Method and Apparatus Using Affirmative/Negative Content Discrimination"; again all commonly assigned with the present invention to the Seiko Epson Corporation of Tokyo, Japan.

BACKGROUND OF THE INVENTION

1. Field of the Invention

The invention generally relates to interactive speech recognition instruments which recognize speech and produce an audible response or specified action based on developed recognition results, and is particularly concerned with voice-based activation of such instruments.

2. Description of the Related Art

Speech recognition devices can be generally classified into two types. The first type is the specific-speaker speech recognition device that can only recognize the speech of a specific speaker, and the second general type is the non-specific speaker speech recognition device that can recognize the speech of non-specific speakers.

In the case of a specific speaker speech recognition device a specific speaker first registers his or her speech signal patterns as reference templates by entering recognizable words one at a time according to an interactive specified interactive procedure. After registration, when the speaker issues one of the registered words. speech recognition is performed by comparing the feature pattern of the entered word to the registered speech templates. One example of this kind of interactive speech recognition device is a speech recognition toy. The child who uses the toy pre-registers, for example, about 10 phrases such as "Good morning," "Good night" and "Good day,", as multiple speech instructions. In practice, when the speaker says "Good morning," his speech signal is compared to the speech signal of the registered "Good morning." If there is a match between the two speech signals, a electrical signal corresponding to the speech instruction is generated, which then makes the toy perform a specified action.

As the name implies, of course, this type of specific speaker speech recognition devices can recognize only the speech of a specific speaker or speech possessing a similar pattern. Furthermore, since the phrases to be recognized must be registered one at a time as part of device initialization, using such a device is quite cumbersome and complex.

By contrast, a non-specific speaker speech recognition device creates standard speech feature patterns of the recognition target phrases described above, using "canned" speech examplars spoken by a large number (e.g., around 200) of speakers. Phrases spoken by a non-specific speaker/user and then compared to these pre-registered recognizable phrases for recognition.

However, such speech recognition devices usually become ready to perform recognition operations and responses only when an external switch is turned on or external power is delivered to the device is turned on, regardless of whether the device uses specific or non-specific speaker recognition. But, in some types of speech recognition devices, it would be more convenient if the device were in a standby state waiting for speech input at all times, and performed recognition operations by sensing speech input, without the need for the user to turn on the switch every time.

Take a stuffed toy utilizing speech recognition, for example. If the toy can be kept in a speech input standby state, i,e., a so-called sleep mode, and can instantly respond when the child calls out its name, it can respond quickly without the need for plugging the device in or pressing, a button, thereby greatly enhancing its appeal as a user-friendly device especially for younger children where applying external power may raise safety concerns. In addition to toys, the same can be said of all electronic instruments that utilize speech recognition.

Some issues must be resolved when keeping the device in a sleep mode and having it perform recognition operations by sensing speech input, as explained above. These include, for example, power consumption and the ability of the device to differentiate between phrases to be recognized and noise, and to act only in response to phrases to be recognized. In particular, since most toys run on batteries, minimizing battery drain is a major issue. Additionally, product prices must also be kept low to maintain commercial appeal for such devices , so using expensive, conventional activation circuitry is undesirable. So, heretofore, there have been a large number of technical restrictions on commercializing interactive speech devices which also feature voice activation.

OBJECTS OF THE INVENTION

It is therefore, an object of the present invention, to enable the device to remain in a sleep mode and perform recognition operations only when a recognizable speech input is detected, to minimize power consumption during the sleep mode, to enable the speech to be recognized at high accuracy even if noise is present in the usage environment, and to enhance commercial appeal of the device by retaining low cost over conventional designs.

SUMMARY OF THE INVENTION

In accordance with this and related objects, a voice activated interactive speech mechanism according to the present invention includes: 1) a sound signal input unit for receiving ambient signals projected to the mechanism; 2) a sound signal analyzer in communication with the sound signal input unit for analyzing sounds perceived by the sound signal input unit and generating voice feature parameters responsive to these analyzed sounds; 3) a phrase detector in communication with the sound signal analyzer for receiving generated voice feature parameters for the perceived sounds, comparing the received data against a set of speech reference templates in an effort to find a match, and generating phrase detection data should a recognizable phrase be found; 4) a speech recognition interactive controller in communication with the phrase detector which receives generated phrase detection data, understands the meaning of the input speech, determines appropriate response content, and performs various controls on the mechanism based on the interpreted speech; 5) a speech synthesizer in communication with the interaction controller for generating synthesized speech output based on the determined response; 6) a speech output unit in communication with the interaction controller and the speech synthesizer for broadcasting the generated synthesized speech; and 7) an input sound signal power detector in communication with at least the sound signal input unit and the interaction controller for detecting the volume, magnitude or amplitude of input sound signals based on sound signal waveforms perceived by the sound signal input unit or capture device. Preferably, this power detector includes processing circuitry for forcing the mechanism to selectively enter or terminate a low-power sleep mode. Moreover, preferably, during this sleep mode, either the interaction controller or the input sound signal power detector itself determines whether input sound signals, as detected by the input sound signal power detector, are at least at a predetermined threshold volume level above the background noise. If so, a determination is then made whether or not threshold filtered input sound signal corresponds to a recognizable phrase, and, if so, shifts the device from the sleep mode into the active mode.

Also, a hardware or software timer can be used to determine if a given perceived sound meets or exceeds the predetermined threshold power level for a specified duration of time. If a given perceived sound signal that is higher in level than this threshold is continuously present for at least this specified duration of time and if the input sound signal is determined not to be a recognizable phrase, the input sound signal is determined to be background noise present in the environment. This aids proper voice activation in a noisy ambient environment. Moreover, the threshold power level may be updated in real time to account for detection of this background noise.

Furthermore, the sound signal power level detector, according to the present invention, may be used as an ambient noise feedback device to enable the speech recognition mechanism to take into account perceived noise levels in formulating the volume of response message and other audible functions. In so doing, the mechanism may set an initial threshold for eliminating noise, and perform power detection for a specified duration of time using this threshold as the reference. Specifically, 1) if an input sound signal that is higher in level than the current threshold is perceived for at least a specified duration of time, and, 2) if the input sound signal is determined not to be a recognizable phrase, the input sound signal is judged by the mechanism to be ambient background noise. At the same time the threshold is updated to a value greater than the perceived background noise level.

Also, the sound signal power level detector according to the present invention may be used by the mechanism to generate an audible response having a volume level corresponding to the perceived power levels of the input sound signal.

Voice activated interactive speech processing according to the present invention includes: 1) sound signal capture for receiving ambient sound signals projected to a receiving device; 2) sound signal analysis for analyzing these sounds and generating voice feature parameter responsive thereto; 3) phrase detection for comparing generated feature parameters data for the perceived sounds against a set of speech reference templates in an effort to find a match, and issuing phrase detection data should a recognizable phrase be found; 4) overall speech recognition interactive control for receiving generated phrase detection data, comprehending the meaning of the input speech, determining appropriate response content, and performing varied tasks responsive to the interpreted speech; 5) speech synthesis for generating synthesized speech output based on the determined response; 6) speech reproduction for broadcasting the generated synthesized speech; and 7) input sound signal power detection for detecting the power, magnitude or amplitude of input sound signals based on perceived sound signal waveforms. Preferably, such speech processing includes the ability to force a speech recognition device to selectively enter or terminate a low-power sleep mode. Moreover, preferably, during this sleep mode, a determination is made whether input sound signals, as detected during input sound signal capture, are at least at a predetermined threshold signal level above the background noise. If so, a determination is then made whether or not the threshold filtered input sound signal corresponds to a recognizable phrase, and, if so, shifts the device from the sleep mode into the active mode.

Also, hardware or software timer processing can be incorporated in speech processing according to the present invention to determine if a given perceived sound meets or exceeds the predetermined threshold power level for a specified duration of time. If a given perceived sound signal that is higher in level than this threshold is continuously present for at least this specified duration of time, and, if the input sound signal is determined not to be a recognizable phrase, the input sound signal is judged to be steady noise present in the environment. This aids proper voice activation in a noisy ambient environment. Moreover, the threshold power level may be updated in real time to account for detection of this steady noise.

Furthermore, according to the present invention, input signal power detection may be used for ambient noise feedback purposes to enable a speech recognition mechanism to take into account perceived noise levels in formulating the volume of response message and other audible functions. In so doing, may set an initial threshold for eliminating noise, and perform power detection for a specified duration of time using this threshold as the reference. Specifically, for an input sound signal that is higher in level than the threshold which is continuously present for a specified duration of time, if the input sound signal is determined not to be a recognizable phrase, the input sound signal is judged by the mechanism to be steady noise present in the environment. Also, the threshold is concurrently updated to a value that is greater than the steady noise level.

Also, sound signal power level detection according to the present invention may incorporate generating an audible response having a volume level corresponding to the perceived power levels of the input sound signal.

As explained hereinabove, when a speech recognition device according to the present invention is in the sleep mode based on a sleep mode request, it determines whether or not the volume level or power level of a perceived input sound signal is at least matches a predetermined threshold volume level and also whether or not the input sound signal constitutes a recognizable phrase. If both of these conditions are satisfied, the device shifts from the low-power sleep mode into the active mode. Otherwise (i.e. a low-level sound or high-level noise situation), the sleep state is maintained. As a result, only phrases to be recognized are processed for recognition while reducing deleterious noise effects. Furthermore, when the device is in the sleep mode, only those portions of the device that consume small amounts of power, such as the sound signal input unit and the input sound signal power detector area, need be active, thereby keeping the total power consumption at a relatively low level (e.g. power consuming speech synthesis and reproduction circuitry may be powered down at this time) in comparison with conventional speech recognition devices.

According to the present invention, if an input sound signal that is higher in level than the threshold is continuously present for a specified duration of time and is determined not to be a recognizable phrase, it is judged to be steady noise present in the environment. In this way, relatively loud ambient noise sounds continuously present for an extended duration in the environment can be considered extraneous and accounted for, and thus the effects of steady noise present in the environment can be reduced. Thus, according to the present invention, voice activation operations can be responsive to a changing noise environment, as would be in the case of carrying a speech recognition toy from a quiet bedroom into the cabin of a family vehicle.

The noise level in the environment is preferably judged based on the power signal from the input sound signal power detector, and a response at a voice level that corresponds to the noise level is output. Therefore, the response can be output at a high voice level if the noise level in the environment is high, making the response easier to hear even when some noise is present in the environment. Of course, when the ambient environment becomes quiet, speech processing according to the present invention permits attenuation of the threshold and increased device responsiveness to external sounds.

Additionally, since the threshold is updated to a value that is greater than the steady noise level, and the noise level at a certain point in time is judged based on the magnitude of the threshold at that point in time, the index of the noise level can be obtained based on the threshold, making it simple to determine the current noise level according to the present invention. Furthermore, even if the noise level changes, the response can be generated at a voice level that corresponds to the noise level, making it possible to output the response at a voice level that better suits the noise in the environment.

Furthermore, according to the present invention, the response may be output at a voice level that corresponds to the power of the input sound signal. Therefore, if the speaker's voice is loud, the response will also be loud; and if the speaker's voice is soft, the response will also be soft, enabling an interactive conversations at a volume level appropriate for the situation.

Other objects and attainments together with a fuller understanding of the invention will become apparent and appreciated by referring to the following description of specific, preferred embodiments and appending claims, taken in conjunction with the accompanying drawings:

BRIEF DESCRIPTION OF THE DRAWINGS

In the drawings, wherein like reference symbols refer to like parts.

DESCRIPTION OF THE PREFERRED EMBODIMENTS

The preferred embodiment of the invention are explained hereinbelow with reference to specific figures, where appropriate the figures. Note that the invention has been applied to a toy in these embodiments, and more particularly to a stuffed toy dog, intended for small children. Furthermore, these embodiments will be explained in which teachings of the present invention are applied to a non-specific speaker speech recognition device that can recognize the speech of non-specific speakers.

Figure 1:
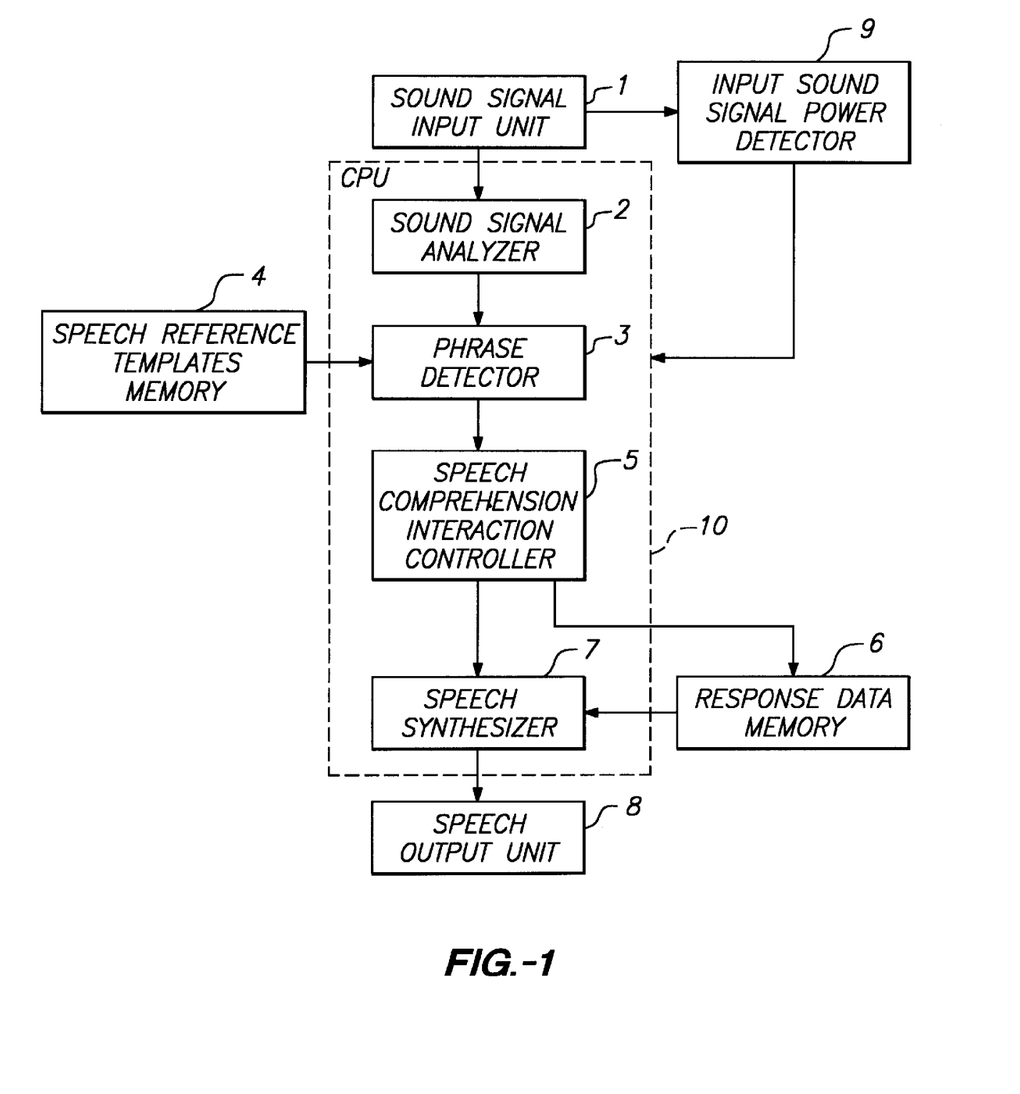
FIG. 1 is a block diagram for explaining the first embodiment of the present invention.

FIG. 1 is a configuration diagram of the first embodiment of the present invention. FIG. 1 schematically shows sound signal capture unit 1, sound signal analyzer 2, phrase detector 3, speech reference templates memory 4, speech comprehension interaction controller 5, response data memory 6, speech synthesizer 7, speech output unit 8 and input sound signal power detector 9. Note that, of these configuration elements, sound signal analyzer 2, phrase detector 3, speech reference templates memory 4, speech comprehension interaction controller 5, response data memory 6, and speech synthesizer 7 are contained inside the belly of the stuffed toy dog, (wherein analyzer 2, phrase detector 3, controller 5 and synthesizer 7 are constituent members of integrated CPU 10) and sound signal capture unit (here a microphone) 1 and speech output unit (here a speaker) 8 are installed in the ear and the mouth, respectively, of the stuffed toy, for example. The functions of these elements are explained in sequence below.

Sound signals (including noise), such as a speaker's voice, are input into the sound signal capture unit comprising a conventional microphone, an amplifier, a lowpass filter, an A/D converter, etc. which are not illustrated here for the sake of simplicity, since their structure does not particularly impact the teachings of the present invention. The sound signal input from the microphone is first passed through the amplifier and the lowpass filter and converted into an appropriate sound waveform. This waveform is converted into a digital signal (e.g., 12 KHz, 16 bits) by the A/D converter, which is then sent to sound signal analyzer 2. Sound signal analyzer 2 uses a programmed CPU to analyze at short intervals the frequency of the waveform signal sent from sound signal capture unit 1, then extracts the multi-dimensional speech feature vector that expresses the frequency characteristics (LPC-CEPSTRUM coefficient is normally used) thereof, and generates the time series (hereafter referred to as "feature vector array") of this characteristic vector for subsequent matching and recognition operations.

The speech reference templates memory 4 preferably comprises a ROM device that stores (registers) voice vector reference templates of the recognition target phrases, created in advance using the speech issued for each word by a large number of typical speakers chosen according to the contemplated uses of the speech recognition device. Here, since a stuffed toy is used for the example, about 10 phrases used for greeting, such as "Good morning," "Good night" and "Good day," "tomorrow," and "weather," for example, will be used as the recognition targets. However, recognition target phrases are not limited to these particular phrases, and a wide variety of phrases can be registered, as will be apparent to those ordinarily skilled in the art. Furthermore, the number of phrases that can be registered certainly need not be limit to 10, and is dependent only in the size of addressable memory 4 utilized.

Also, although not shown in FIG. 1, phrase detector 3 comprises a general or special-purpose processor (CPU) and a ROM device storing the processing program, and determines if and to what degree of certainty the input voice target phrases registered in reference templates memory 4 may be present. Hidden Markov Model (HMM) or DP matching can be used by phrase detector 3 as is well known in the art word-spotting processing technology. However, in these embodiments, keyword-spotting processing technology using the dynamic recurrent neural network (DRNN) method is preferably used as disclosed in U.S. application Ser. No. 08/078,027, filed Jun. 18, 1993, entitled "Speech Recognition System", commonly assigned with the present invention to Seiko-Epson Corporation of Tokyo, Japan, which is incorporated fully herein by reference. Also, this method is disclosed in the counterpart laid open Japanese applications H6-4097 and H6-119476. DRNN is used in order to perform voice recognition of virtually continuous speech by nonspecific speakers and to output word detection data as described herein.

Figure 2A:
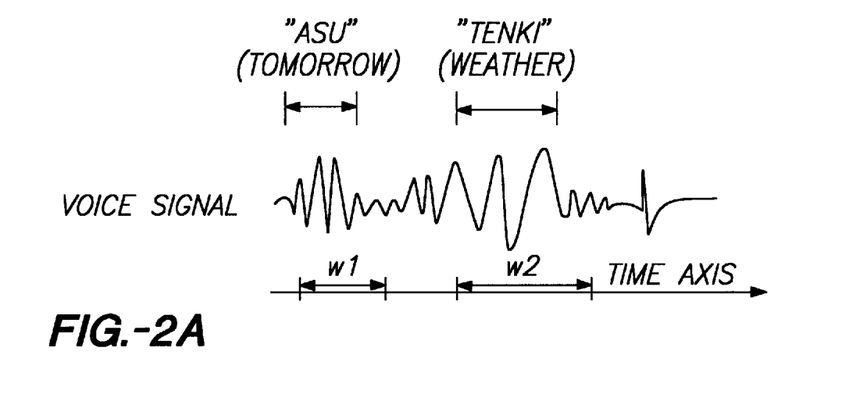
FIGS. 2A–2E diagramatically illustrate a sample input voice waveform and resultant partial word lattice for explaining phrase detection by the phrase detector and speech recognition by the speech comprehension interaction controller according to the present invention.

The following is a brief explanation of the specific processing performed by phrase detector 3 with reference to FIGS. 2A–2E. Phase detector 3 determines the confidence level at which a word registered in speech reference templates memory 4 occurs at a specific location in the input voice. Now, suppose that the speaker inputs an example Japanese language phrase "asu no tenki wa. . . " meaning "Concerning tomorrow's weather". Assume that in this case the stylized voice signal shown in FIG. 2A represents the audio waveform for this expression.

In the expression "asu no tenki wa . . . ", the contextual keywords or target phrases include "asu" (tomorrow) and "tenki" (weather). These are stored in the form of vector series reference templates in speech reference templates memory 4 as parts of the a predetermined word registry, which in this case, represents approximately 10 target distinct words or phrases. If 10 phrases are registered, signals are output by the phrase detector 3 in order to detect phrases corresponding to these 10 phrases (designated phrase 1, phrase 2, phrase 3 . . . up to phrase 10). From the information such as detected signal values, the phrase detector determines the confidence level at which the corresponding words occur in the input voice.

Figure 2B:
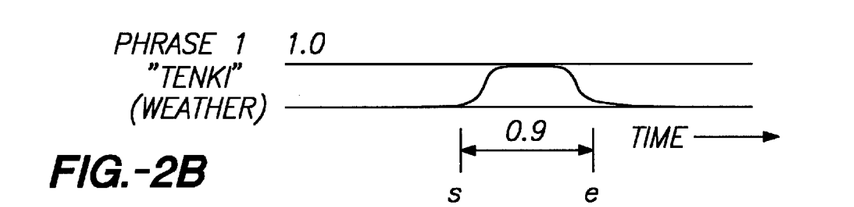

More specifically, if the word "tenki" (weather) occurs in the input voice as phrase 1, the detection subunit that is waiting for the signal "tenki" (weather) initiates an analog signal which rises at the portion "tenki" in the input voice, as shown in FIG. 2B. Similarly, if the word "asu" (tomorrow) occurs in the input voice as word 2, the detection subunit that is waiting for the signal "asu" rises at the portion "asu" in the input voice, as shown in FIG. 2C.

Figure 2C:
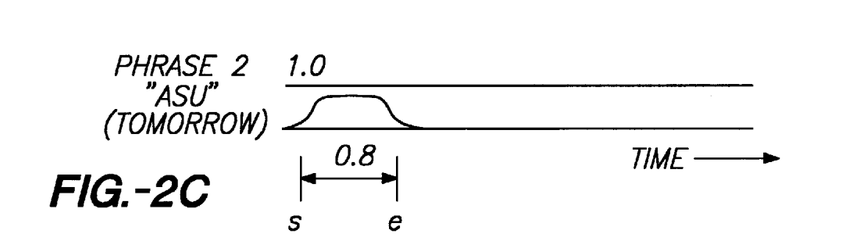
Figure 2D:
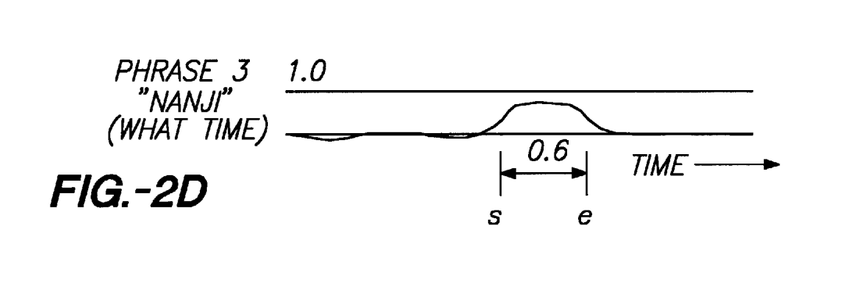
Figure 2E:
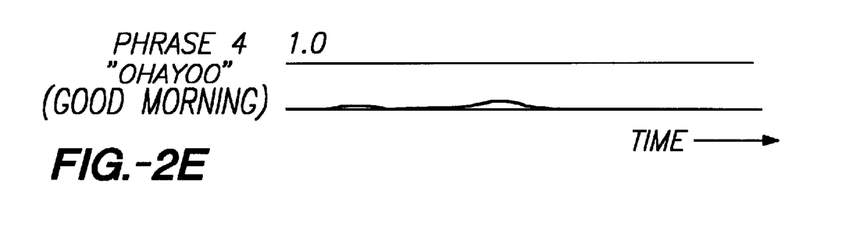

In FIGS. 2B and 2C, the numerical values 0.9 and 0.8 indicate respective confidence levels that the spoken voice contains the particular pre-registered keyword . The relative level or magnitude of this level can fluctuate between ~0 and 1.0, with 0 indicating a zero confidence match factor and 1.0 representing a 100% confidence match factor. In the case of a high confidence level, such as 0.9 or 0.8, the registered or target phrase having a high confidence level can be considered to be a recognition candidate relative to the input voice.

Thus, the registered word "asu" occurs with a confidence level of 0.8 at position wl on the time axis. Similarly, the registered word or phrase "tenki" occurs with a confidence level of 0.9 at position w2 on the time axis.

Also, the example of FIGS. 2A–2E shows that, when the word "tenki" (weather) is input, the signal that is waiting for phrase 3 (phrase 3 is assumed to be the registered word "nanji" ("What time. . . . ") also rises at position w2 on the time axis with relative uncertain confidence level of approximately 0.6. Thus, if two or more registered phrases exist as recognition candidates at the same time relative to an input voice signal, the recognition candidate word is determined by one of two methods: either by 1) selecting the potential recognition candidate having the highest degree of similarity to the input voice (using absolute confidence level comparisons) as the actually recognized keyword or phrase; or by 2) method of selecting one of the words as the recognized word by creating a predefined correlation table expressing contextual rules between words. In this case, the confidence level for "tenki" (weather) indicates that it has the highest degree of similarity to the input voice during time portion w2 on the time axis, even though "nanji" can also be recognized as a potential recognition candidate. Therefore, "tenki" is selected as the actual recognition candidate for this example. Based on these confidence levels, interaction controller 5 performs the recognition of input voices.

Collectively, the detection information, including starting and ending points on the time axis and the maximum magnitude of the detection signal indicating the confidence level, for each pre-registered word contained in non-specific speaker word registry within speech reference templates memory 4, is known as a word lattice. In FIGS. 2B–2E, only a partial four dimensional lattice is shown for the sake of clarity, but a word lattice including detection information for every pre-registered phrase is in fact generated by the phrase detector 3.

Though not shown in FIG. 1, interaction controller 5 is also principally composed of a processing unit and ROM that stores a processing program for completing the tasks described below.

In particular, speech comprehension interaction controller 5 selects a recognition word output from phrase detector 3. Based on the composite word lattice, the interaction controller recognizes a voice (comprehending the overall meaning of the input voice), references response data memory 6, preferably consisting of a ROM device determines a response according to the comprehended meaning of the input voice, and transmits appropriate response information and control overhead to both speech synthesizer 7 and speech output unit 8.

For example, when the detected data or partial word lattice shown in FIGS. 2B–2E is relayed from phrase detector 3, the interaction controller determines one or more potential recognition candidates denoted in the word lattice as a keyword occurring in the input. In this particular example, since the input voice is "asu no tenki wa" (the weather tomorrow), the words "asu" (tomorrow) and "tenki" (weather) are detected. From the keywords "asu" and "tenki", the voice recognition conversation control unit understands the contents of the continuous input voice "asu no tenki wa".

The voice recognition processing of virtually continuous voice by keyword spotting processing, as described above, is applicable to other languages as well as Japanese. If the language to be used is English, for instance, some of the recognizable words that can be registered might be "good morning", "time", "tomorrow", and "good night". The feature patterns for these recognizable registered words is stored in speech reference templates memory 4. If the speaker asks "What time is it now?", the word "time" in the clause "what time is it now" is used as a keyword in this case. When the word "time" occurs in the input voice, the detection signal that is waiting for the word "time" rises at the portion "time" in the input voice. When detected data (word lattice) from phrase detector 3 is input, one or more words in the input voice is determined as a keyword. Since in this example the input voice is "what time is it now", "time" can be detected as a keyword, and the speech comprehension and interaction controller may thus understand the contents of the continuous input voice "what time is it now?",when appropiate context rules are established.

Note that, as described hereinabove, separate CPUs can be provided to perform such control functions as speech analysis, phrase detection, speech comprehension interaction control, and speech synthesis. However, in this embodiment, main CPU 10 is provided for performing all of these processes, as shown in FIG. 1; and for all the embodiments explained herein assume that this single CPU 10 performs all processing.

The recognition of an input speech signal (speech issued by a speaker) and an example of a response action were described above. The first embodiment of the invention normally keeps such an interactive speech recognition device in the sleep mode, and detects and only recognizes the input speech signal when a speech signal to be recognized is input.

Figure 3A:
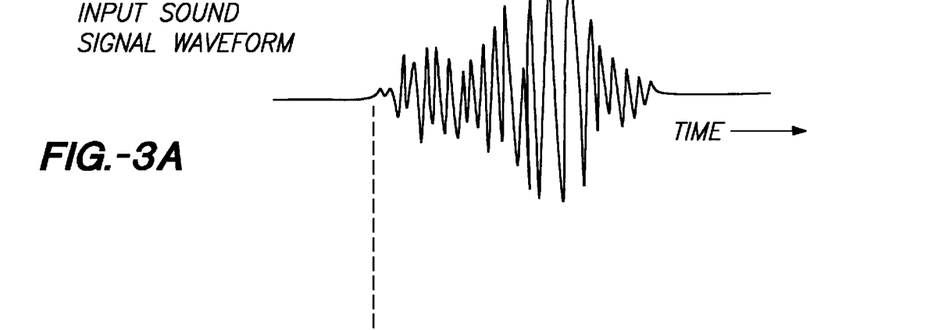
FIGS. 3A and 3B diagramatically illustrate a simplified input sound signal waveform and its corresponding power signal.
Figure 3B:
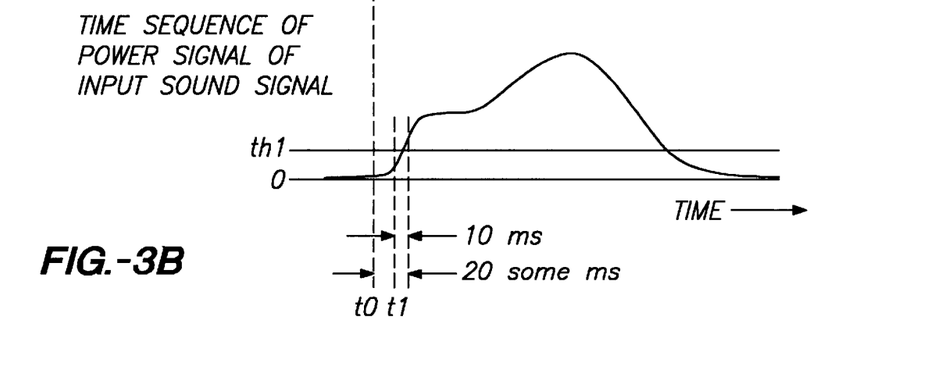

Input sound signal power detector 9 shown in FIG. 1 detects the power of the input sound signal (including noise) output by sound signal input unit 1, and detects the power signal based on the input sound signal waveform shown in FIG. 3A as that shown in FIG. 3B, for example. This input sound signal power detector 9 is always in the ready state to detect the power of the input sound signal fetched by sound signal input unit 1 regardless of whether the device is in the sleep mode or the active mode.

Incidentally, various initial state setting methods are available for setting the device in the sleep mode. For example, a stuffed toy can be automatically set in the sleep mode when a battery is inserted. Alternatively, a sleep mode setting switch or a sleep mode selection switch can be provided, and this setting switch can be turned on or the sleep mode selection switch can be set to the setting mode side to set the device in the sleep mode. When either of these techniques are used for setting the device in the sleep mode, a sleep mode request is issued to the above-mentioned CPU 10, and then the sleep mode flag is set. After the sleep mode is initially set, the stuffed toy is placed in the sleep mode after conversation with the toy is finished. In this particular embodiment, if the speaker is quiet for a specified duration or if the speaker says "Be quiet" or "Good night" to the stuffed toy, the device interprets this as a sleep mode request, sets the sleep mode flag and places itself in the sleep mode.

The processing that takes place in such a configuration will be explained with reference to the flow chart shown in FIG. 4.

First, it will be assumed that initial setting of the sleep mode has already been performed in a manner described above, as is known in the art. Even during the sleep mode, input sound signal power detector 9 remains active and ready to detect the power of the input sound signal fetched by sound signal input unit 1. However, CPU 10 is placed in a non-active state or sleep mode, as is well known in the computing arts.

Now, further assume that voice is input from sound signal input unit 1 and that the sound signal waveform shown in FIG. 3A, for example, is output by sound signal capture unit 1. Based on this, input sound signal power detector 9 detects the input sound signal power as explained below.

Figure 4:
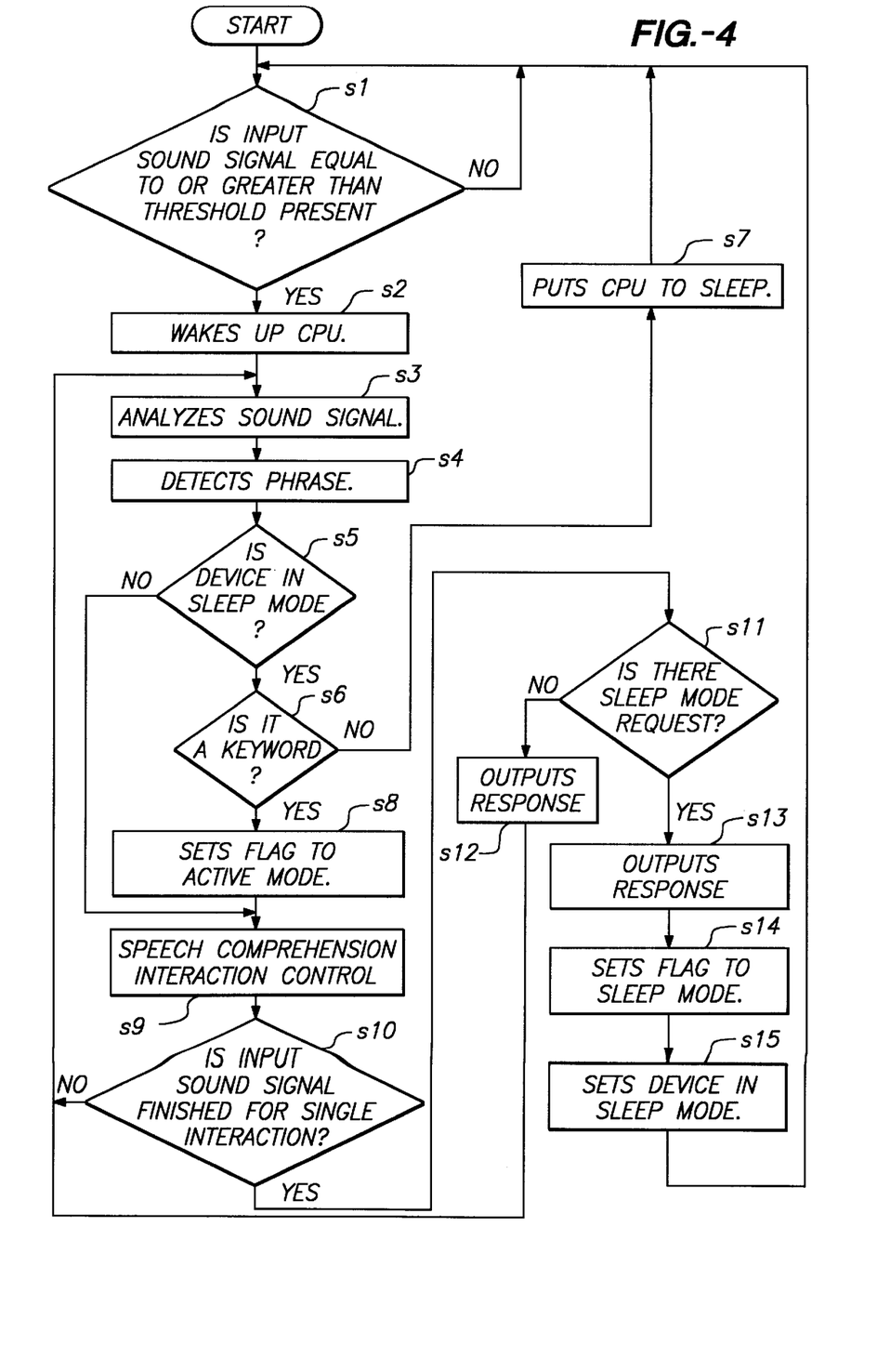
FIG. 4 is a flow chart for explaining voice activation processing according to the first embodiment.

Control begins at step s1, as shown in FIG. 4. In step s1, input sound signal power detector 9 determines whether or not the power of the input sound signal is greater than a preset threshold th1, and outputs a signal indicating that a sound signal has been input when the power of the input sound signal becomes greater than threshold th1 (at time t1 FIG. 3A). In such manner the input signal power detector continues to monitor for sound input signals until one meeting or exceeded threshold th1 is encountered. Thereafter, control passes to step s2 in which CPU 10 wakes up (step s2), and after a specified amount of time following t1, (in about 10 msec) speech analyzer 2 thereof performs speech analysis processing based on the signal captured by sound signal capture unit 1 (step s3). As can be seen from FIG. 3B, approximately 20 some msec are required from time t0 at which the sound signal is input, to the time at which sound signal analysis processing starts, and thus the actual sound signal analysis processing starts 20 some msec after the sound signal is input. However, this intrinsic delay should not affect phrase recognition processing in any way, as will be appreciated by those ordinarily skilled in the art. Control thereafter passes to step s4.

Phrase detection processing is performed by comparing the sound signal analysis result to the speech reference templates data (step s4), and control passes to step s5 in which a determination is made as to whether the device is currently in the sleep mode or in an active mode (step s5). This determination is made by querying the aforementioned sleep mode flag. Since this flag is initially set in this case (meaning that the mechanism is in sleep mode), control passes on to step s6 and accumulated phrase detection data is used to determine whether or not the input sound signal contains a preregistered recognizable keyword using the above-described recognition techniques. If the input sound signal is determined not to contain a keyword such as "Power On"; "Hello" "Good Morning" or the like, the input sound signal is judged to be noise or some other speech signal not intended for the stuffed toy, so control passes to step s7 CPU 10 goes inactive, and processing returns to step s1, wherein the device again listens for sound signal input.

On the other hand, if the input sound signal is determined to be a keyword in step s6, control instead passes to step s8 in which sleep mode flag is cleared for shifting the device from the sleep mode to the active mode. For example, if the input sound signal is the keyword "Good morning," the device switches to the active mode at this point and performs speech comprehension interaction control processing for the input speech signal (step s9). A determination of whether or not the input speech signal has been completed for a single exchange is then made (step s1O), and if not completed, the processing returns to sound signal analysis (step s3). On the other hand, if it is determined that the input speech signal has been completed for a single interaction, the processing shifts to the determination of whether or not a sleep mode request is present (step s11). As whether or not the input speech signal has been completed for a single interaction specifically means whether or not a single conversation has been finished. For example, if the speaker says "Good morning," the stuffed toy may respond with "Good morning. . . . You are up early today" and the conversation may progress interactively. If the conversation is to continue according to predefined context and action/response rules, it is determined that the speech signal input is not finished, the sound signal of the speaker's speech continues to be analyzed (step s3) and phrase detection described above is performed (step s4). Note that since the device is no longer in the sleep mode in this case, speech comprehension interaction control (step s9) occurs immediately following phrase detection (step s4). This comprises normal speech recognition processing operation according to the present invention, and as explained above, the keyword spotting process is used for recognizing a phrase that becomes a keyword in the speech signal issued by the speaker, and a corresponding response is output.

When a series of conversations (a single interaction) is finished, the control passes to step s11 in which a determination is made as to whether or not a sleep mode request is present. This determination is made in the following way, for example. If the speaker says "Be quiet" or "Good night" to the stuffed toy or if the speaker is quiet for a specified duration, the device interprets this as a sleep mode request. If neither of these sleep mode requests is present, the device assumes that the conversation is continuing, issues a prompt for the speaker's speech (step s12) e.g. "I'm waiting", and repeats the processing beginning with step s3. On the other hand, if either of these sleep mode requests is present, the device issues a shutdown response as needed (step s13), and then sets the sleep mode flag (step s14). In this way, the device and CPU 10 go into the sleep mode (step s15) and returns to the state in step s1 again. Note that, in the processing of step s13, if said the key request is "Good night," for example, the flag is set to the sleep mode after the stuffed toy responds with "Good night."

As explained hereinabove, by keeping the device (a stuffed toy in this case) in the sleep mode, the speaker need not bother to turn on the switch when he or she wants to converse with the stuffed toy, and can simply speak to the toy using a recognizable phrase, yet economical battery drain characteristics can be preserved. For example, the stuffed toy can be configured to issue some response if a child merely calls out the name (assumed to be preregistered) of the stuffed toy without turning on the switch.

In addition to toys, teachings of the present embodiment can also be applied to voice-activated electronic instruments. In such a case, the need for turning on the switch is eliminated, and when a predetermined speech signal is issued, the instrument can take the appropriate action. Therefore, the invention can be utilized in an extremely wide range of applications.

In the present invention, CPU 10 is in an inactive, power-saving state during the sleep mode, and only sound signal capture unit 1 and input sound signal power detector 9 are in the active state. In conventional speech recognition devices, power consumption by an active mode CPU 10 is substantial in order to handle complex speech recognition tasks. By contrast, the power consumption by sound signal capture unit 1 and input sound signal power detector 9 is relatively quite small. In the present invention, CPU 10 momentarily wakes up when a sound signal of at least a certain level is input. However, even when the input sound signal turns out to be a speech signal, CPU 10 immediately goes inactive if that speech signal is determined not to be one of the recognizable phrases. CPU 10 goes into the active mode if and only if the speech signal possesses power of at least a certain level and is a recognizable phrase (keyword). Therefore, power consumption during the sleep mode can be kept at an extremely low level, even in noisy environments.

The reason for using the input sound signal power detector 9 to compare the power of the input sound signal or voice to a certain threshold, and for considering a signal to be valid only if it is equal to or above the threshold, is to eliminate the effects of the noise present in the environment. This aspect of the invention is explained in further detail hereinbelow.

For example, if noise such as continuous automobile noise near a highway or continuous construction noise is present in the environment, it is undesirable to treat such noise as input sound signals and to wake up CPU 10 for an extended time period. To resolve such problems, a threshold is set such that CPU 10 wakes up only when a sound signal equal to or greater than the threshold is input. Note that the threshold will be adaptive to noise level changes.

Figure 5A:
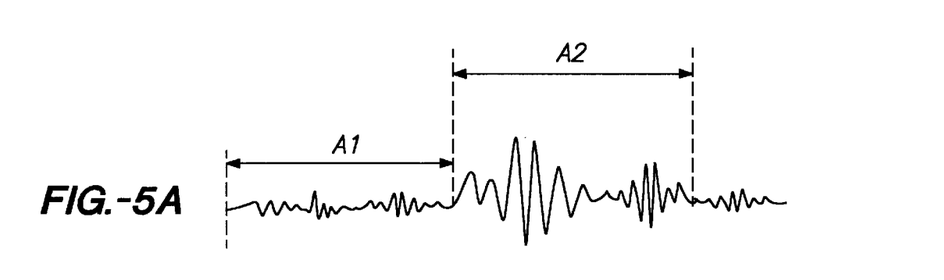
FIGS. 5A and 5B diagramatically illustrate a stylized input sound wave form in which both the threshold and respond output levels are set according to the noise level according to the present invention.
Figure 5B:
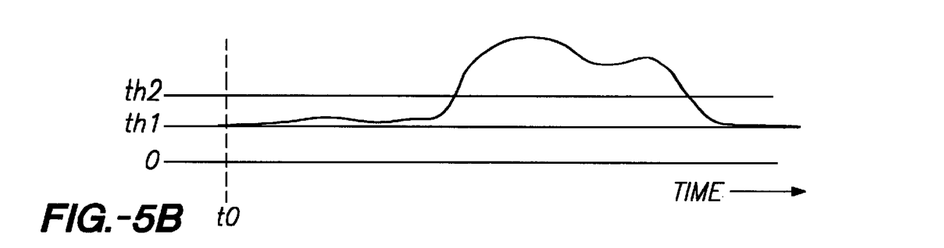

As described above, the sleep mode is initially set when a battery is inserted or when a switch is set to the sleep mode. In some cases, no speech signal to be recognized is input for a period of time and only "background noise" is perceived. For example, assume that input sound signal waveform A1 due to steady noise is output for a while starting at time t1, and afterwards input sound signal waveform A2 of a recognizable phrase "Ohayoo," for example, is output as shown in FIG. 5A. FIG. 5B shows the power signal for these input sound signals (including the speech signal) over time. Assuming that the first threshold set is denoted as th1, if the noise level is higher than this threshold th1, the processing in steps s2 through s6 in the flow chart in FIG. 4 takes place, i.e., CPU 10 wakes up, analyzes the sound signal of the noise, detects a phrase, and then determines whether or not the phrase is a keyword. However, since the input sound signal is noise in this case and not the speech signal of a keyword, the processing in steps sl through s6 will be repeated for a certain period of time. If such processing continues for a certain duration, a software timer expires, the input sound signal is judged to be noise, and the threshold is reset from th1 to a higher value th2. (See FIG. 5B.)

If a sound signal (A2) whose level is higher than the newly set threshold th2 is input and if its input sound signal is judged to be the speech signal of a recognizable phrase (keyword), the flag is switched from the sleep mode to the active mode, and the device goes into the active mode for the first time.

By changing the threshold in this way as the noise level changes, the device is not affected by steady noise that continues for an extended duration, and can positively recognize only those speech signals that should be recognized.

In the first embodiment explained above, an input sound signal is discerned by detecting its power, and only when a sound signal is input, CPU 10 momentarily wakes up, determines whether or not the input sound signal is a keyword, goes into the active mode if the signal is determined to be a keyword, and performs a series of operations such as recognition and response control. The following second embodiment explains the process in which the response level is set based on the noise level when noise is present in the environment, and the process in which the volume of the input speech signal is detected and the response level is set based on that volume level.

First, the process in which the response level is set based on the noise volume level when noise is present in the environment will be explained. To implement this scheme, the above-mentioned adaptive threshold will be used as an index for judging the noise magnitude. That is, in the first embodiment described hereinabove, the threshold was initially set at th1 to avoid the effects of noise and was later reset to a new threshold th2 according to the noise level encountered in the environment (th1<th2).

Since the threshold is adaptively set according to the current noise level, the threshold can, of course, be used as the index for the noise that is present at a particular time. In other words, by having CPU 10 judge the current threshold being used and by presetting a response level that corresponds to that threshold, the response can be output at a level that matches the noise level existing at the time the threshold is updated.

For example, if the current threshold is th1, the noise level is judged to be relatively low, and the response is output at a level that is preset for that noise level. On the other hand, if the current threshold is th2, the noise level is judged to be slightly higher, and the response is output at a level that is preset for that noise level and higher. By setting the response level according to the noise level present in the environment in this way, the device responds at a higher sound level if the noise level is somewhat high, making the response content easier to hear even when some ambient noise is present in the environment.

Next, an alternative will be explained in which the response level is set based on the power level of the input sound signal. In this case, the device will respond in a loud voice if the speaker's voice is loud, and in a soft voice if the speaker's voice is soft. For example, when it is quiet such as late at night, it would be more desirable to keep the conversation with the device at a soft voice level so as not to disturb other people. Conversely, in a noisy environment, it would be natural to use a voice of higher volume. People who are hard of hearing tend to use a loud voice, and it would be desirable for the device to respond in a loud voice in such a case. Taking these points into consideration, the input sound signal level is detected and the response output level is set accordingly.

For example, suppose that the speaker asks "What time is it?" in a soft voice late at night. Even if the device has been in the sleep mode, CPU 10 goes into the active mode and can perform recognition and generate a response as long as the phrase "what time" is a registered recognizable phrase and its signal level is higher than the threshold in effect at the time. While CPU 10 is active, the power signals of input sound signals are constantly being input, and CPU 10 can identify the power of the current input sound signal by monitoring these power signals. CPU 10 compares the power of the speech signal "What time is it?" to several levels of preset threshold values, for example, and based on this result, generates a response output that corresponds to the power of the speech signal that was input. In other words, the response content is output at a high voice level if the level of the input speech signal is high, and at a low voice level if the level of the input speech is low. In this case, since the speaker asked "What time is it?" in a soft voice, "It's 11 o'clock," for example, will be output at a low voice level.

In this way, by having the device respond in a loud voice if the speaker's voice is loud, and in a soft voice if the speaker's voice is soft, it becomes possible to carry on a conversation at a level that suits the situation and does not disturb other people when it is quiet such as late at night, as described above.

Note that when noise is present in the environment, both the process of setting the response level according to the noise level of the environment and the process of detecting the power of the input sound signal and setting the response level based on the detected power are naturally applicable to the device explained in the first embodiment, in which the sleep mode can be set, and are also applicable to devices in which the sleep mode cannot be set.

Furthermore, although an example has been explained in which the present invention is applied to a non-specific speaker speech recognition device, the invention can also be applied to specific speaker speech recognition devices.

All of the above embodiments include examples wherein the present invention may be applied to a stuffed doll toy, the present invention in no means limited to stuffed dolls. Naturally, it can be applied to other toys as well. Further, in addition to toys, the invention can be applied to interactive game machines and electronic appliances that are used in every day life. And certainly in ordinary skill in the voice recognition art can apply the invention to languages other than Japanese or English and still obtain the desired objects. Thus, the invention has a broad range of application worldwide.

While the invention has been described in conjunction with several specific embodiments and applications, it is evident to those skilled in the art that any further alternatives, modifications and variations will be apparent in light of the foregoing description. This may include, in addition to stuffed animal toys, such as applications and embodiments as scanning machines, home electronics, computer subsystems, electronic appliances or similar devices. Thus, the invention described herein is intended to embrace all such alternatives, modifications, applications and variations as may fall within the spirit and scope of the appended claims.

What is claimed is:

1. A method for implementing transient, voice-based activation in CPU-driven speech recognition equipment including a speech recognition CPU and a low power consuming input sound signal power detector, comprising the steps of:

(A) placing the speech recognition CPU in a sleep mode wherein the speech recognition CPU is inactive but the input sound signal power detector is active;

(B) detecting whether a first sound continuously exceeds a predetermined volume for at least a predetermined time period;

(C) enabling the speech recognition CPU to determine whether the detected first sound contains at least one keyword recognized by the speech recognition CPU as an activation command, and performing one of the following steps, if it is detected that the first sound continuously exceeds the predetermined volume for at least the predetermined time period:

(1) activating the speech recognition CPU, if the detected first sound contains the at least one keyword recognized by the speech recognition CPU as an activation command, or (2) returning the speech recognition CPU to the sleep mode if the detected first sound fails to contain the at least one keyword recognized by the speech recognition CPU as an activation command.

2. The method of claim 1, further comprising the steps of:

determining whether a received second sound contains at least one keyword recognized by the speech recognition CPU as a deactivation command, if the detected first sound contains the at least one keyword recognized by the speech recognition CPU as an activation command; and returning the speech recognition CPU to the sleep mode, if the detected second sound contains the at least one keyword recognized by the speech recognition CPU as a deactivation command.

3. The method of claim 1, wherein the first sound has first volume level greater than the threshold volume, and wherein step (C) further comprises issuing an audible response at a second volume level substantially equal to the first volume level.

4. The method of claim 1, wherein, in step (C)(2), the threshold volume is selectively increased if the detected first sound fails to contain the at least one keyword recognized by the speech recognition CPU as an activation command.

5. A voice-activated speech recognition apparatus, comprising:

a sound signal input unit that receives a sound and translates the received sound into digital form;

a speech recognition CPU having an active mode and a sleep mode, comprising:

a sound signal analyzer in communication with said sound signal input unit to generate voice feature parameters for the received digitized input sound, when said speech recognition CPU is in the active mode;

a phrase detector in communication with said sound signal analyzer to determine whether the feature parameters substantially match speech reference template information corresponding to pre-registered expressions and generate phrase detection data in response thereto, when said speech recognition CPU is in the active mode; and a speech comprehension interaction controller in communication with said phrase detector to recognize a meaning from the received digitized input sound based on the received phrase detection data and conversation content and to formulate an appropriate response corresponding to the recognized meaning, when said speech recognition CPU is in the active mode; and a low power consuming input sound signal power detector in communication with said sound signal input unit and said speech recognition CPU, wherein, when said speech recognition CPU is in the sleep mode, said input sound signal power detector remains active and determines whether the received input sound exceeds a threshold volume for at least a predetermined time period, and wherein said input signal power detector enables said speech recognition CPU, if the received input sound exceeds the threshold volume for at least the predetermined time period, to determine whether the received input sound contains at least one keyword recognized by said speech recognition CPU as an activation command, and cooperates in placing said speech recognition CPU in the active mode if said speech recognition CPU determines that the received input sound contains the at least one keyword that corresponds to an activation command.

6. The apparatus of claim 5, wherein said input sound signal power detector selectively increases the threshold volume if the received input sound exceeds the threshold volume for at least the predetermined time period but said speech recognition CPU determines the at least one input sound does not contain the at least one keyword that corresponds to an activation command.

7. The apparatus of claim 5, wherein the input signal power detector comprises:

a first determining circuit for determining whether the received input sound exceeds the threshold volume for at least the predetermined time period;

a communication mechanism responsive to said first determining circuit and communicating with said speech recognition CPU for placing the speech recognition CPU into the active mode, if the received input sound exceeds the threshold volume for at least the predetermined time period and said speech recognition CPU determines that the received input sound contains the at least one keyword that corresponds to an activation command; and a threshold volume adjuster in communication with said first determining circuit and said speech recognition CPU for selectively increasing the threshold volume, if the received input sound exceeds the threshold volume for the predetermined time period but said speech recognition CPU determines that the received input sound does not contain the at least one keyword that corresponds to an activation command.

8. The apparatus of claim 5, wherein the speech recognition CPU further comprises a speech synthesizer in communication with said speech comprehension interaction controller to generate synthesized audio corresponding to the appropriate response formulated by said speech comprehension interaction controller, when the speech recognition CPU is in the active mode.

9. The apparatus of claim 8, wherein said speech recognition CPU further comprises a response volume adjuster responsive to said input signal power level detector and said speech synthesizer for tailoring the volume level of the appropriate response based on the perceived volume level of the given input sound signal.

* * * * *

UNITED STATES PATENT AND TRADEMARK OFFICE
CERTIFICATE OF CORRECTION

PATENT NO.    : 5,983,186
DATED         : November 09, 1999
INVENTOR(S)   : Yasunaga Miyazawa, et al.

It is certified that errors appear in the above identified patent and that said Letters Patent is hereby corrected as shown below:

Column 14, line 55, insert --,-- after "mode".

Column 16, line 11, change "the at least one" to --that the received--.

Signed and Sealed this

Fifteenth Day of August, 2000

Attest:

Q. TODD DICKINSON

Attesting Officer        Director of Patents and Trademarks